(12) United States Patent
Childress

(10) Patent No.: US 12,172,753 B2
(45) Date of Patent: Dec. 24, 2024

(54) SYSTEMS AND METHODS FOR MONITORING STORAGE OF CARRY-ON ITEMS IN STORAGE BINS OF AN AIRCRAFT

(71) Applicant: THE BOEING COMPANY, Chicago, IL (US)

(72) Inventor: Jamie J. Childress, Mercer Island, WA (US)

(73) Assignee: THE BOEING COMPANY, Arlington, VA (US)

( * ) Notice: Subject to any disclaimer, the term of this patent is extended or adjusted under 35 U.S.C. 154(b) by 371 days.

(21) Appl. No.: 17/645,908

(22) Filed: Dec. 23, 2021

(65) Prior Publication Data
US 2022/0212799 A1    Jul. 7, 2022

Related U.S. Application Data

(60) Provisional application No. 63/134,676, filed on Jan. 7, 2021.

(51) Int. Cl.
*B64D 11/00* (2006.01)
*B64D 47/08* (2006.01)
(Continued)

(52) U.S. Cl.
CPC ........ *B64D 11/0015* (2013.01); *B64D 11/003* (2013.01); *B64D 47/08* (2013.01);
(Continued)

(58) Field of Classification Search
CPC .............. B64D 11/0015; B64D 11/003; B64D 45/0053; B64D 47/08; B64F 1/36; G06V 20/52; G06V 20/59; G08B 21/182
See application file for complete search history.

(56) References Cited

U.S. PATENT DOCUMENTS 6,964,481 B2   11/2005   Pho et al.
7,499,802 B2    3/2009   Mishima et al.
(Continued)

FOREIGN PATENT DOCUMENTS

EP      3244618 A1    11/2017
JP    2018011290 A     1/2018
WO   2020263528 A1    12/2020

OTHER PUBLICATIONS

Extended European Search Report dated Sep. 2, 2022 issued in corresponding EP Application No. 22150424.4, pp. 1-9.

*Primary Examiner* — Kenny A Cese
(74) *Attorney, Agent, or Firm* — Moore IP Law

(57) ABSTRACT

A system of monitoring carry-on items for a flight of an aircraft includes one or more cameras positioned to capture images of carry-on items associated with passengers of an aircraft. The system includes an interface configured to receive image data from the one or more cameras. The system also includes one or more processors coupled to the interface. The one or more processors are configured to analyze the image data to determine characteristics of a carry-on item. The one or more processors are configured to determine that one or more alert conditions are satisfied based on a comparison of one or more alert criteria to the characteristics of the carry-on item and data associated with the aircraft. The one or more processors are also configured to send, to one or more devices, an output based on satisfaction of the one or more alert conditions.

20 Claims, 7 Drawing Sheets

(51) Int. Cl.
*B64F 1/36* (2024.01)
*G06V 20/00* (2022.01)
*G06V 20/59* (2022.01)
*G08B 21/18* (2006.01)
*G06V 20/52* (2022.01)

(52) U.S. Cl.
CPC ............... *B64F 1/36* (2013.01); *G06V 20/59* (2022.01); *G08B 21/182* (2013.01); *G06V 20/52* (2022.01)

(56) References Cited

U.S. PATENT DOCUMENTS

| | | | |
|---|---|---|---|
| 8,325,232 | B2 | 12/2012 | Lee |
| 8,631,697 | B2 | 1/2014 | Giugno et al. |
| 9,126,705 | B2 | 9/2015 | Ours et al. |
| 9,764,842 | B2 | 9/2017 | Woicekowski |
| 11,006,078 | B1 * | 5/2021 | Patel ................ H04N 7/181 |
| 11,763,209 | B1 * | 9/2023 | Srinivasan ................ G06T 7/62 705/5 |
| 2005/0076372 | A1 | 4/2005 | Moore et al. |
| 2005/0110952 | A1 | 5/2005 | Pho et al. |
| 2005/0168630 | A1 | 8/2005 | Yamada et al. |
| 2006/0161345 | A1 | 7/2006 | Mishima et al. |
| 2007/0101398 | A1 | 5/2007 | Islam |
| 2007/0252038 | A1 | 11/2007 | Alvarez |
| 2007/0265890 | A1 | 11/2007 | Curtis |
| 2008/0071398 | A1 | 3/2008 | Kneller et al. |
| 2008/0251640 | A1 | 10/2008 | Johnson et al. |
| 2009/0094615 | A1 | 4/2009 | Ohno et al. |
| 2010/0100225 | A1 | 4/2010 | Reed et al. |
| 2012/0137636 | A1 | 6/2012 | Ours et al. |
| 2012/0242508 | A1 | 9/2012 | Kohlmeier-Beckmann |
| 2012/0330850 | A1 | 12/2012 | Giugno et al. |
| 2013/0055321 | A1 | 2/2013 | Cline et al. |
| 2013/0070860 | A1 | 3/2013 | Schramm et al. |
| 2013/0290221 | A1 | 10/2013 | Jindel |
| 2013/0298173 | A1 | 11/2013 | Couleaud et al. |
| 2014/0077952 | A1 | 3/2014 | Boss et al. |
| 2014/0192268 | A1 | 7/2014 | Petrisor |
| 2015/0239561 | A1 | 8/2015 | Hau et al. |
| 2015/0241209 | A1 | 8/2015 | Jouper et al. |
| 2016/0109280 | A1 | 4/2016 | Tiu et al. |
| 2016/0332729 | A1 | 11/2016 | Woicekowski |
| 2017/0137032 | A1 | 5/2017 | Wuthnow et al. |
| 2017/0200203 | A1 | 7/2017 | Kingsbury et al. |
| 2017/0230620 | A1 | 8/2017 | Watanabe |
| 2017/0316664 | A1 | 11/2017 | Gerard |
| 2017/0332148 | A1 | 11/2017 | Fullerton et al. |
| 2018/0086464 | A1 * | 3/2018 | Riedel ................ G06K 17/00 |
| 2018/0173962 | A1 * | 6/2018 | Ibrahim ................ B64D 47/08 |
| 2018/0359985 | A1 | 12/2018 | Jung et al. |
| 2019/0202564 | A1 | 7/2019 | Jung et al. |
| 2019/0233113 | A1 | 8/2019 | Carswell |
| 2019/0325356 | A1 * | 10/2019 | Savian ................ G06Q 10/02 |
| 2020/0233901 | A1 * | 7/2020 | Crowley ............ G06V 20/647 |

* cited by examiner

SYSTEMS AND METHODS FOR MONITORING STORAGE OF CARRY-ON ITEMS IN STORAGE BINS OF AN AIRCRAFT

CROSS-REFERENCE TO RELATED APPLICATIONS

The present application claims priority from U.S. Provisional Patent Application No. 63/134,676 entitled "SYSTEMS AND METHODS FOR MONITORING STORAGE OF CARRY-ON ITEMS IN STORAGE BINS OF AN AIRCRAFT," filed Jan. 7, 2021, the contents of which are incorporated by reference in their entirety.

FIELD OF THE DISCLOSURE

The present disclosure is generally related to monitoring storage of carry-on items in storage bins of an aircraft.

BACKGROUND

Many airlines allow passengers of an aircraft to have a carry-on item that is able to fit in a storage bin (e.g., an overhead storage bin) of the aircraft and one personal item (e.g., a purse briefcase, laptop bag, etc.) that is able to fit under the seat in front of the passenger. Airlines may have size limits for carry-on items to allow for proper operation of the storage bins and to allow each passenger to take a carry-on item on the aircraft. For example, some airlines have a 22 inch by 14 inch by 9 inch size limit for carry-on items. Other airlines may have different size limits. One or more passengers with oversized carry-on items, or improperly oriented carry-on items in storage bins, personal items in the storage bins where carry-on items could be placed, or combinations thereof, can cause a clogged aisle during boarding and boarding delays. Storage space in storage bins often fills up for a flight, which can result in the need to tag and store with checked luggage one or more carry-on items associated with some passengers of the aircraft.

SUMMARY

In a particular implementation, a system for monitoring carry-on items for a flight of an aircraft includes one or more cameras positioned to capture images of carry-on items associated with passengers of an aircraft. The system includes an interface configured to receive image data from the one or more cameras. The system also includes one or more processors coupled to the interface. The one or more processors are configured to analyze the image data to determine characteristics of a carry-on item. The one or more processors are configured to determine that one or more alert conditions are satisfied based on a comparison of one or more alert criteria to the characteristics of the carry-on item and data associated with the aircraft. The one or more processors are also configured to send, to one or more devices, an output based on satisfaction of the one or more alert conditions.

In a particular implementation, a method of monitoring carry-on items for a flight of an aircraft includes receiving, at a monitor device, image data from cameras onboard the aircraft. At least a portion of the cameras are positioned to capture images of interiors of storage bins on the aircraft. The method includes analyzing, at the monitor device, the image data to determine first information. The first information includes characteristics of items in each of the storage bins and includes available storage space in each of the storage bins. The method includes determining, at the monitor device, that one or more alert conditions are satisfied based on a comparison of one or more alert criteria to the first information. The method also includes sending, from the monitor device to one or more devices, output based on satisfaction of the one or more alert conditions.

In a particular implementation, a method of monitoring carry-on items for a flight of an aircraft includes receiving, at a monitor device, image data from one or more cameras in a boarding area for the aircraft. The one or more cameras are positioned to capture images of carry-on items associated with passengers preparing to board the aircraft. The method includes analyzing, at the monitor device, the image data to determine characteristics of a carry-on item associated with a passenger. The method includes determining, at the monitor device, that one or more alert conditions are satisfied based on a comparison of one or more alert criteria to the characteristics of the carry-on item and data associated with the flight. The method also includes sending an output based on satisfaction of the one or more alert conditions to one or more devices.

The features, functions, and advantages described herein can be achieved independently in various implementations or may be combined in yet other implementations, further details of which can be found with reference to the following description and drawings.

DETAILED DESCRIPTION

Figure 1:
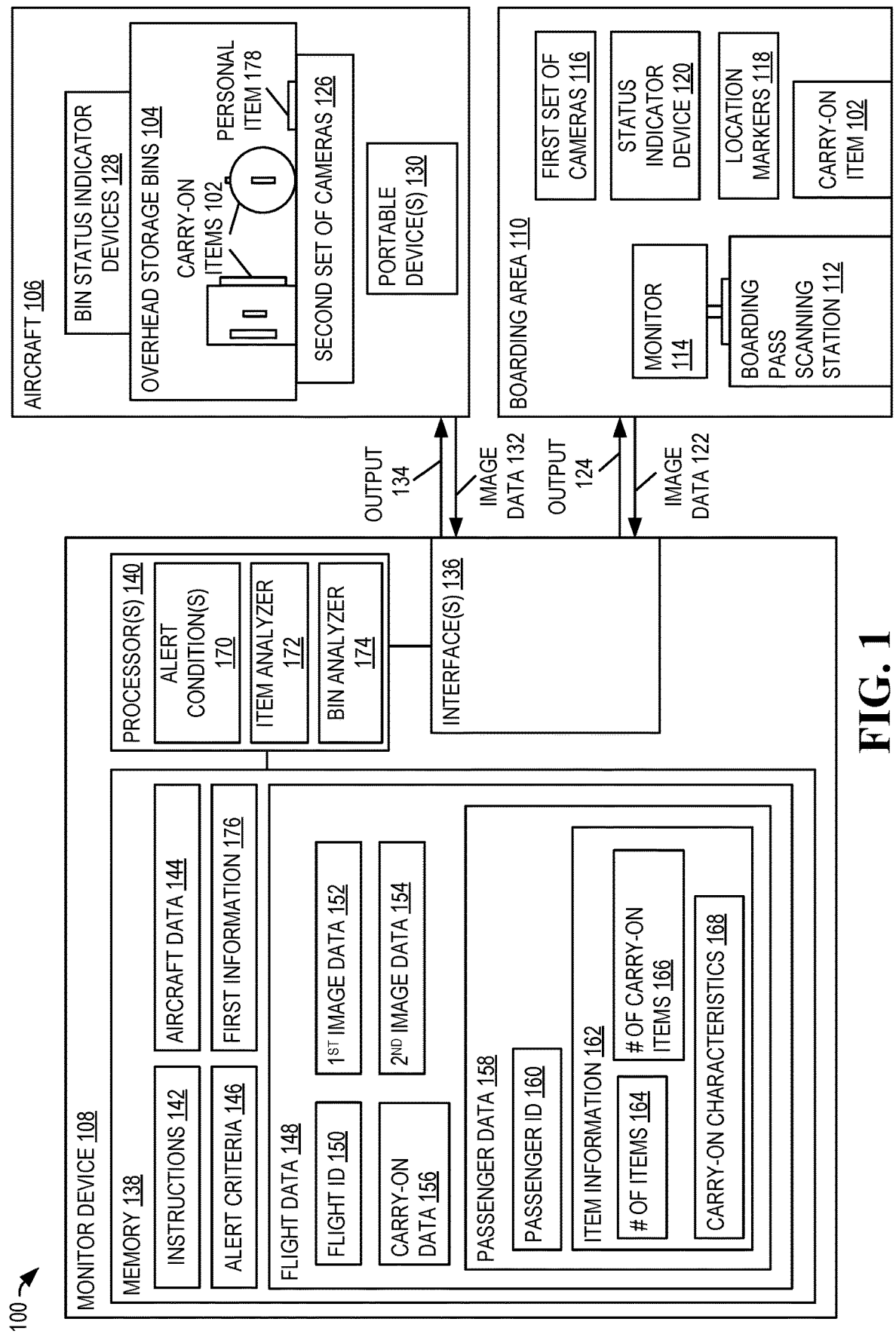
FIG. 1 is a diagram that illustrates a system configured to monitor carry-on items for a flight of an aircraft.

Aspects disclosed herein present systems and methods for monitoring storage of carry-on items in storage bins of an aircraft.

In a particular aspect, a monitor device analyzes image data from cameras in an aircraft or in a boarding area for the aircraft to detect items (e.g., personal items and carry-on items) associated with passengers of the aircraft. Based on an analysis of the image data, the monitor device can determine if an alert condition is associated with one or more of the passengers. For example, the monitor device can determine that a particular passenger has an oversized carry-on item, has too many items, or both. When the monitor device detects an alert condition associated with a passenger, the monitor device alerts a boarding agent or crew member. Based on the alert, the boarding agent or the crew member can resolve the alert condition associated with the passenger.

In addition, the monitor device tracks a number of carry-on items allowed onto the aircraft. Based on bin storage capacity for the aircraft and the number of carry-on items allowed on the aircraft, the monitor device can determine when to stop allowing additional carry-on items onto the aircraft and can send an alert to the boarding agent or crew member that indicates that additional carry-on items should be tagged and stored with checked luggage or that other actions should be taken to determine how many more passengers can take their carry-on items onto the aircraft.

In a particular aspect, a monitor device analyzes image data from cameras onboard the aircraft. At least a portion of the cameras are positioned to take images of interiors of storage bins of the aircraft. Based on an analysis of the image data, the monitor device determines a status associated with each storage bin. For example, based on the image data for an storage bin, the monitor device can determine if space is available in the storage bin for one or more additional items, can determine if the storage bin is full, can determine if additional space can be made in the storage bin by moving one or more items in the storage bin or by changing an orientation of one or more of the items in the storage bin, can determine if an item is stored in a prohibited location, can determine if one or more items could inhibit the storage bin from being closed, etc. For each storage bin, the monitor device sends a signal to a status indicator device associated with the storage bin that causes the status indicator device to display a particular status indicator (e.g., a color code) to indicate a status associated with the storage bin during a boarding process. In addition, the monitor device can send information regarding the status of each storage bin to a portable device associated with a crew member of the aircraft. The crew member can address any problems detected by the monitor device.

In addition, the monitor device can send information regarding remaining storage space in the storage bins to a device associated with the boarding agent. The information sent to the boarding agent can allow the boarding agent to provide a warning to remaining passengers that one or more passengers may have to have their carry-on items tagged and stored with checked luggage when available space for carry-on items is running out. The information can also indicate when the boarding agent should stop allowing additional carry-on items onto the aircraft.

In another particular aspect, the monitor device receives image data from a first set of cameras in the boarding area and from a second set of cameras onboard the aircraft. When one or more alert conditions are determined for items associated with a passenger in the boarding area, the monitor device sends output to one or more devices associated with the boarding agent to enable the boarding agent to resolve the alert conditions. The monitor device also monitors the storage bins in the aircraft based on image data from the second set of cameras and provides information regarding the status of each storage bin to a status indicator device for the storage bin and to a device associated with a crew member of the aircraft.

Image data from the boarding area, information determined from the image data from the boarding area, image data from the aircraft, and information determined from the image data from the aircraft can be stored in a database. If an issue with a passenger occurs before takeoff of the aircraft (e.g., a passenger leaves the aircraft before takeoff), or if an issue with an item associated with a passenger (e.g., a carry-on item is left on the aircraft after the aircraft reaches a destination), information in the database can be accessed and analyzed to resolve the issue. For example, if a passenger exits the aircraft before the takeoff of a flight, information in the database can be accessed to make sure that items associated with the passenger are removed from the aircraft before takeoff of the aircraft.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a monitor device 108 including one or more processors ("processor(s)" 140 in FIG. 1), which indicates that in some implementations the monitor device 108 includes a single processor 140 and in other implementations the monitor device 108 includes multiple processors 140. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

In the following description, various functions are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules described as separate entities may be integrated into a single component or module. Components or modules of electronic devices may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

FIG. 1 depicts an example of a system 100 that is configured to monitor storage of carry-on items 102 in storage bins 104 of an aircraft 106. The system 100 includes a monitor device 108 communicatively coupled to one or more electronic devices in a boarding area 110 for the aircraft 106 and communicatively coupled to one or more electronic devices in the aircraft 106. The boarding area 110 may be a part of an airport terminal. The monitor device 108 performs analysis of items associated with passengers of the aircraft 106 and provides output based on the analysis to one or more devices in the boarding area 110, to one or more devices in the aircraft 106, or both.

In a particular implementation, the one or more electronic devices in the boarding area 110 include a boarding pass scanning station 112 with a monitor 114 visible to a boarding agent, a first set of cameras 116, location markers 118, and a status indicator device 120. In other implementations, the one or more electronic devices include additional devices, different devices, fewer devices, or combinations thereof. The first set of cameras 116 are positioned to take images of passengers and items associated with passengers as the passengers approach and reach the boarding pass scanning station 112. In some implementations, the first set of cameras 116 include one or more video cameras, one or more still image cameras, one or more lidar cameras, other types of cameras, or combinations thereof.

The location markers 118 act as calibration references. For example, the location markers 118 are disposed such that each location marker 118 is in a field of view of one or more cameras of the first set of cameras 116. Additionally, locations of the location markers 118 may be known by or accessible to the monitor device 108. Images of particular location markers 118 in image data 122 from the first set of cameras 116 in combination with the location data enables the monitor device 108 to calculate dimensions of items (e.g., carry-on items 102) in the boarding area 110 from the image data 122 and the location data.

The status indicator device 120 includes a visual or auditory output (such as a light, a buzzer, a speaker, or a display) to alert a boarding agent who is processing passengers for entry onto the aircraft 106. The status indicator device 120 is activated to indicate a status of items associated with the passenger based on output 124 received from the monitor device 108. In an implementation, the status indicator device 120 generates a first alert (e.g., displays a first color of light, makes a first sound, or both) based on the output 124 when the monitor device 108 determines there is no issue with items associated with the passenger; generates a second alert (e.g., displays a second color of light, makes a second sound, or both) when the monitor device 108 determines that there is an issue with at least one item associated with the passenger; and generates a third alert (e.g., displays a third color of light, makes a third sound, or both) when the monitor device 108 cannot determine whether there is an issue with one or more items associated with the passenger. In other implementations, the status indicator device 120 generates other types of alerts, such as a text alert or an image (e.g., an image of a carry-on item that is problematic).

When the status indicator device 120 indicates that there is no issue with the items associated with the passenger, the boarding agent allows the passenger to proceed to the aircraft 106 after processing a boarding pass of the passenger at the boarding pass scanning station 112. When the status indicator device 120 indicates that there is an issue with one or more items associated with the passenger, the output 124 sent by the monitor device 108 includes a notice that causes the monitor 114 to display details associated with the issue and selectable options for the boarding agent. The boarding agent can select a particular selectable option that indicates to the monitor device 108 how the issue was resolved. For example, the monitor device 108 can determine that two items are associated with a particular passenger, and that both items are of a size that qualifies as a carry-on item 102. Since each passenger is allowed to take only one carry-on item 102 on the aircraft 106, the monitor device 108 provides the output 124 that sends a signal to cause the status indicator device 120 to indicate that there is an issue and sends a notice to the monitor 114. The notice indicates that the particular passenger has two items that qualify as carry-on items 102 and provides a first selectable option indicating that the particular passenger was allowed on the aircraft 106 with a carry-on item 102 and a second selectable option that the particular passenger was allowed on the aircraft with no carry-on item 102.

When the status indicator device 120 indicates that the monitor device 108 cannot determine whether there is an issue with items associated with a passenger, the monitor device 108 sends output 124 that includes a notice to the monitor 114 with selectable options indicating responses the boarding agent can make (e.g., allow the passenger on the aircraft 106 with a carry-on item 102 or allow the passenger on the aircraft 106 without a carry-on item 102). The boarding agent can visually inspect the items associated with the passenger to determine if there is an issue and act accordingly. The boarding agent can select the appropriate selectable option and continue boarding remaining passengers. For example, when a position of a carry-on item associated with a particular passenger relative to the particular passenger prevents the monitor device 108 from determining whether the carry-on item is oversized from the image data 122, the monitor device sends the output 124 with a signal that causes the status indicator device 120 to indicate that no decision was made with respect to the carry-on item 102 associated with the particular passenger, and sends a notice to the monitor 114. The notice indicates that the monitor device 108 could not determine if the carry-on item 102 is oversized and includes a first selectable option indicating that the passenger was allowed on the aircraft 106 with the carry-on item 102 and a second selectable option that the particular passenger was allowed on the aircraft 106 without a carry-on item. When dimensions of the carry-on item 102 associated with the particular passenger are needed for calculations performed by the monitor device 108 (e.g., determination of available storage space in the storage bins 104), the monitor device 108 sets undetermined dimensions to maximum allowable values for a carry-on item 102.

In a particular implementation, the one or more electronic devices onboard the aircraft 106 include a second set of cameras 126, a bin status indicator device 128 associated with each storage bin 104 of the aircraft 106, and one or more portable devices 130 (e.g., tablet computers, smartphones, etc.) associated with crew members of the aircraft 106. Each portable device 130 includes an application configured to interface with the monitor device 108. In other implementations, the one or more electronic devices in the aircraft 106 include additional devices, different devices, fewer devices, or combinations thereof. In some implementations, the second set of cameras 126 include video cameras, still image cameras, lidar cameras, other types of cameras, or combinations thereof. In some implementations, a data connection is physically connected to the aircraft 106 to supply power to the second set of cameras 126 and the bin status indicator devices 128 and to enable communication between the monitor device 108, the second set of cameras 126, and the bin status indicator devices 128. In other implementations, power for the second set of cameras 126 and the bin status indicator devices 128 is provided from a power system of the aircraft 106, and communication of the second set of cameras 126 and the bin status indicator devices 128 with the monitor device 108 is provided wirelessly or by a physical data connection to the aircraft 106.

One or more cameras of the second set of cameras 126 are positioned to take images of items stored in the storage bins 104 of the aircraft 106 and provide image data 132 to the monitor device 108. For example, the one or more cameras of the second set of cameras 126 are coupled to bin divider walls, support structures, upper surfaces of the storage bins 104, storage bin doors, other surfaces, or combinations thereof. In some implementations, one or more other cameras of the second set of cameras 126 are positioned to capture images of passengers and items associated with the passengers as the passengers store their items and go to their seats. In some implementations, a particular camera of the second set of cameras 126 is configured to take images of an interior of a storage bin 104 located across an aisle from the particular camera. Known dimensions of the storage bins 104 and known spaces reserved in particular storage bins for safety equipment or other items facilitate determination of available space and item orientation in the storage bins 104. In some implementations, the storage bins 104 can include one or more reference markers at known positions, can include at least two cameras for each storage bin 104 to provide stereo vision, or both, to facilitate determination of item dimensions, spacing in the storage bins 104, and item orientation in the storage bins 104.

The monitor device 108 determines a status of each of the storage bins 104 and sends output 134 that includes status signals to the bin status indicator devices 128. Each bin status indicator device 128 generates a visual display storage bin responsive to a status signal of the output 134 from the monitor device 108. The visual display indicates a status of the storage bin 104 associated with the bin status indicator device 128. For example, the visual display can include text (e.g., "FULL"), a color code (e.g., red to indicate a full storage bin 104), or both.

The portable device 130 receives output 134 from the monitor device 108 including information that indicate the status of the storage bins 104 in the aircraft 106. The information enables the portable device 130 to display visual information (e.g., text, graphics, and images), and generate audio information (e.g., particular sounds to indicate a problem associated with a storage bin 104), or both. In some implementations, the portable device 130 displays a diagram of a portion of a fuselage of the aircraft 106 with storage bins 104, and each storage bin 104 is displayed in a color that indicates a status associated with the storage bin 104. The crew member associated with the portable device 130 can scroll the diagram, zoom in, zoom out, and select a particular storage bin. When the crew member selects a particular storage bin, an image of the particular storage bin taken by a camera of the second set of cameras 126 that shows the interior of the particular storage bin is sent from the monitor device 108 to the portable device 130 for display.

The monitor device 108 includes one or more interfaces 136, a memory 138, one or more processors 140, or a combination thereof. The one or more interfaces 136 enable communication between the monitor device 108 and one or more electronic devices in boarding area 110, one or more electronic devices on the aircraft 106, other electronic devices, or combinations thereof. The memory 138 includes a non-transitory computer-readable medium (e.g., a computer-readable storage device) that stores instructions 142 that are executable by the processor 140. The instructions 142 are executable to initiate, perform or control operations to aid in monitoring items, which include carry-on items 102, associated with passengers of the aircraft 106.

The memory 138 includes aircraft data 144. The aircraft data 144 includes bin information for the aircraft 106. In some implementations, the aircraft data 144 includes data for different types of aircraft 106 or for different aircraft interior configurations. The bin information includes number of storage bins, total available space for each storage bin, dimensions for each storage bin, identifiers of particular storage bins with space restrictions and locations in the particular storage bins of restricted spaces, etc.

The memory includes alert criteria 146. The alert criteria 146 includes information used by the processor 140 to determine whether one or more alert conditions are satisfied. The alert criteria 146 include thresholds for certain conditions. For example, the alert criteria 146 include a per-passenger item count threshold that indicates a maximum number of items (or carry-on items) a passenger is allowed to take onto the aircraft 106, a per-flight carry-on count threshold that indicates a number of carry-on items 102 allowed on the aircraft 106, dimension thresholds (e.g., length, width, and height) for carry-on items 102, other thresholds associated with limits for passengers or the aircraft 106, or combinations thereof.

The memory includes flight data 148. In some implementations, the flight data 148 is stored in a database of the monitor device 108 or in a database on one or more external devices that allows access to the flight data 148 by the monitor device 108. The flight data 148 includes a flight identifier 150 (e.g., a flight number), first image data 152, second image data 154, carry-on data 156, and passenger data 158 for each passenger allowed on the aircraft 106. The first image data 152 is a portion of the image data 122 taken by one or more cameras of the first set of cameras 116 during the boarding process for the aircraft 106. The second image data 154 is a portion of the image data 132 from one or more cameras of the second set of cameras 126. The second image data 154 includes image data of passengers in the aircraft as the passengers stow items associated with the passengers and take their seats and images of interiors of each storage bin 104 taken by one or more of the cameras of the second set of cameras 126. In some implementations, the flight data 148 does not include the first image data 152, the portion of the second image data 154 corresponding to images of passengers in the aircraft, the portion of the second image data 154 corresponding to images of each storage bin 104, or combinations thereof.

The carry-on data 156 includes aggregate information about carry-on items 102 onboard the aircraft 106. In an implementation, the carry-on data 156 indicates a total number of carry-on items onboard the aircraft 106. In other implementations, the carry-on data 156 is the total number of carry-on items and an aggregate of at least one dimension (e.g., a height dimension) of the carry-on items onboard the aircraft. The total number of carry-on items and the aggregate of the at least one dimension can be used by the monitor device 108 to determine an estimate of a number of additional carry-on items storable in the storage bins 104. The estimate of the number of additional carry-on items storable in the storage bins can be provided by the monitor device 108 to the monitor 114 to inform the boarding agent of available storage space for carry-on items 102 remaining on the aircraft 106.

The passenger data 158 includes information for each passenger who has boarded the aircraft 106. The passenger data 158 includes passenger identification information 160 and item information 162 for items associated with the passenger. In some implementations, the passenger identification information 160 includes data included on a boarding pass (e.g., a name and a seat number) that is scanned by the boarding pass scanning station 112, images of the passenger and items associated with the passenger from the image data 132, or both. The item information 162 is determined from the image data 122 for a passenger at or approaching the boarding pass scanning station 112.

The item information 162 includes a number of items 164 associated with the passenger including any carry-on items 102, a number of carry-on items 166, and carry-on characteristics 168 (e.g., estimates of dimensions of the carry-on items 102) when there is a carry-on item 102. In some implementations, an item is considered to be a carry-on item 102 based on its size. For example, if the item is larger than dimensions associated with a personal item 178, such as too large to be stowed in a pocket of a seatback in front of the passenger or under the seat in front of the passenger, the item is considered to be a carry-on item 102. In some implementations, each item carried by a passenger is considered to be a carry-on item 102. In some implementations, if a passenger has more than one item, the largest item is considered to be a carry-on item 102. In some implementations, the alert criteria 146 specify thresholds used by the monitor device 108 to characterize an item as a personal item 178 or a carry-on item 102. The number of items 164, the number of carry-on items 166, and the carry-on characteristics 168 are used by the processor 140 of the monitor device 108 with the alert criteria 146 to determine if there are one or more alert conditions 170 for the items associated with the passenger.

The processor 140 includes an item analyzer 172, a bin analyzer 174, or both, that can be implemented at least in part by the processor 140 executing the instructions 142. The processor 140 can be implemented as a single processor or as multiple processors, such as in a multi-core configuration, a multi-processor configuration, a distributed computing configuration, a cloud computing configuration, or any combination thereof. In some implementations, one or more portions of the item analyzer 172, the bin analyzer 174, or both, are implemented by the processor 140 using dedicated hardware, firmware, or a combination thereof.

The item analyzer 172 is configured to identify items associated with passengers approaching or at the boarding pass scanning station 112 based on the image data 122 from the first set of cameras 116, determine if the items include carry-on items 102, and determine one or more characteristics (e.g., length, width, and height) associated with the carry-on items 102. The carry-on items 102 can be of different sizes and shapes, and the carry-on items 102 can be located in different places relative to passengers associated with the carry-on items 102. For example, some carry-on items 102 are roller bags that are being pulled via an extendable/retractable handle of the roller bag or being carried by another handle of the roller bag. As another example, some carry-on items 102 can be backpacks on backs of passengers or backpacks carried by a handle or strap, tote bags, or other types of carriers. The item analyzer provides a status for items associated with a passenger as an alert condition 170. In some implementations, the item analyzer 172 includes a machine learning model, such as a neural network, a random forest, a gradient boosted decision tree, a statistical model, or a combination thereof.

The bin analyzer 174, based on the image data 132 from the second set of cameras 126 positioned to capture images of the interiors of storage bins 104 in the aircraft 106, is configured to determine orientations of items in the storage bins 104, identify an amount of available space in each of the storage bins 104, and determine if there are item storage issues in any of the storage bins 104. The bin analyzer 174 provides a status of each storage bin 104 as an alert condition 170. In some implementations, the bin analyzer 174 includes a machine learning module, such as a neural network, a random forest, a gradient boosted decision tree, a statistical model, or a combination thereof.

During operation, the monitor device 108 determines that boarding of the aircraft 106 for a flight is commencing. The determination can be based on activation of a scanner of the boarding pass scanning station 112, receipt of input from a boarding agent, etc. In response to commencement of boarding, the first set of cameras 116 in the boarding area 110 are activated to capture images of the boarding area 110. The image data 122 from the first set of cameras 116 is provided to the monitor device 108 for analysis by the item analyzer 172. Also in response to commencement of boarding, the bin status indicator devices 128 and the cameras of the second set of cameras 126 in the aircraft 106 are activated. In an implementation, the bin status indicator devices 128 and cameras of the second set of cameras 126 associated with closed storage bins 104 remain inactive until the corresponding storage bins 104 are opened.

As each passenger approaches, or arrives at, the boarding pass scanning station 112, the item analyzer 172 of the monitor device 108 analyzes the image data 122 from the first set of cameras 116 to determine whether one or more items are associated with the passenger and creates an entry in the flight data 148 for the passenger data 158 associated with the passenger. When one or more items are associated with the passenger, the monitor device 108 determines and saves the item information 162, including the carry-on characteristics 168 if one or more of the items is a carry-on item 102. The carry-on characteristics 168 can include dimensions of the carry-on item 102 and other information. For example, if the monitor device 108 determines that there is a security alert for a particular carry-on item that identifies a color of one or more portions of the particular carry-on item, the other information would include data indicating a color or colors of the carry-on item 102.

Based on the carry-on characteristics 168, the aircraft data 144, and the alert criteria 146, the monitor device 108 determines whether one or more alert conditions 170 are satisfied. If the monitor device 108 determines that one or more alert conditions 170 are satisfied, determines that particular information associated with the carry-on item 102 cannot be determined from the image data 122 (e.g., dimensions of the carry-on item), or both, the monitor device 108 provides the output 124 to one or more electronic devices in the boarding area 110. The output 124 includes a particular signal to the boarding agent via the status indicator device 120 and a message to the monitor 114 indicating the one or more alert conditions 170, indicating what characteristic the monitor device 108 cannot determine, or both. When the message is associated with the carry-on item 102, the message includes selectable options associated with boarding agent responses to the message (e.g., a first selectable option indicating the boarding agent allows the carry-on item 102 on the aircraft 106 and a second selectable option indicating the boarding agent does not allow the carry-on item 102 on the aircraft 106). Selection of the appropriate selectable option allows the monitor device 108 to maintain and save appropriate carry-on data 156. In response to the particular signal, the boarding agent can visually inspect the carry-on item 102 and process the passenger and the carry-on item 102 accordingly (e.g., allow the carry-on item 102 on the aircraft 106 or tag the carry-on item 102 for storage with checked luggage). The boarding agent can choose the selectable option that indicates how the boarding agent responded to the message.

When the monitor device 108 determines particular information associated with the carry-on item 102 and determines that the alert conditions 170 is that the passenger is approved for boarding the aircraft 106, the monitor device 108 provides a particular signal to the status indicator device 120 that informs the boarding agent that the boarding agent can process the passenger and allow the passenger to board the aircraft 106 with the carry-on item 102.

When the boarding agent processes the passenger (e.g., scans a boarding pass of the passenger), the passenger data 158 is stored by the monitor device 108. In addition, the carry-on data 156 is updated if the passenger is associated with a carry-on item 102.

Also during operation, the monitor device 108 receives image data 132 from the second set of cameras 126 in the aircraft 106. The bin analyzer 174 of the monitor device 108 processes the image data 132 from the second set of cameras 126 to determine information about items stored in the storage bins 104 of the aircraft 106 and available space in the storage bins 104. When the boarding process is initiated and a storage bin 104 is open, the image data 132 includes data corresponding to interiors of the interior of opened storage bins 104. In some implementations, operational power is not supplied to cameras of the second set of cameras 126 that provide image data 132 for interiors of storage bins 104 when the corresponding storage bins 104 are closed.

Based on portions of the image data 132 and based on portions of the aircraft data 144, the monitor device determines, and saves in the memory 138, first information 176 for each of the storage bins 104. The first information 176 for each storage bin 104 includes item characteristics of each item in the storage bin 104 and includes data about storage space in the storage bin 104. The item characteristics for an item in a storage bin 104 include dimensions of the item. The dimensions of items in the storage bins 104 are used to determine types of items (e.g., personal item, article of clothing, or carry-on item, or other type of item), the orientation of the items, remaining available storage space, and other information associated with the items. In some implementations, the space in a storage bin 104 corresponds to linear space along a length of the storage bin 104 available for additional items in the storage bin 104.

For each storage bin 104, the monitor device 108 determines a status associated with the storage bin 104 based on information determined by the bin analyzer 174 from the image data 132, the aircraft data 144, and one or more thresholds from the alert criteria 146. A first status of the storage bin 104 indicates that there is space for items in the storage bin 104. A second status indicates that there is an opportunity to make space in the storage bin 104 by reorienting one or more items, repositioning one or more items (e.g., placing the items closer together), or by removing one or more personal items or articles of clothing from the storage bin 104 that can be stored in a seat pocket or on the floor by the passenger associated with the item. A third status indicates that the storage bin 104 is full. A fourth status indicates a problem with the storage bin 104. As passengers place items in the storage bin 104, the monitor device 108 analyzes the image data 132 for the storage bin 104 and updates the status associated with the storage bin 104 when the status changes.

If the monitor device 108 determines, for a time longer than a threshold amount of time (e.g., one minute, two minutes, or some other time period), that placement of one or more items in the storage bin inhibits closure of the storage bin 104 or that portions of one or more items (e.g., straps) extend out of the storage bin 104, the monitor device 108 changes the status of the storage bin 104 to the fourth status to indicate that there is a problem with the storage bin 104. The threshold amount of time provides an amount of time for passengers or crew members to correct problems and only changes the status to the fourth status when a problem with the storage bin 104 is persistent.

The information determined by the monitor device 108 includes characteristics of the items in the storage bin 104. The characteristics may include a first dimension corresponding to a longest length of the item in a direction parallel to the bottom of the storage bin 104 and a second dimension corresponding to a longest length of the item in a direction parallel to a side of the storage bin 104. The characteristics are compared to one or more thresholds from the alert criteria 146 to determine whether an item placed on the bottom of the storage bin 104 qualifies as a carry-on item 102, a personal item, or another type of item. If the bin analyzer determines that an item placed on the bottom of the storage bin 104 is a personal item, the status associated with the storage bin 104 is changed to the second state to indicate that extra space can be made in the storage bin 104. The extra space may be made by removing the personal item from the storage bin 104 or storing the personal item on top of a carry-on item 102 in the storage bin 104 if there is enough space.

The monitor device 108 also compares the first dimension to the second dimension. When the first dimension is greater than the second dimension and a ratio of the first dimension to the second dimension is greater than a threshold, the status of the storage bin 104 is changed to the second status to indicate that additional space can be made in the storage bin 104 by reorienting one or more items in the storage bin 104. The ratio of the first dimension to the second dimension being greater than the threshold prevents a status change associated with orientation for an item with a profile that will not substantially change when reoriented (e.g., a profile that is almost square or circular).

The monitor device 108 determines separation distances between items placed on the bottom of the storage bin 104 and available space in the storage bin 104. When a sum of the separation distances exceeds a threshold amount (e.g., an allowable width of carry-on items 102), the status associated with the storage bin 104 is changed to the second state to indicate that extra space can be made in the storage bin 104. When the available space in the storage bin 104 is less than a threshold (e.g., an allowable width of carry-on items) without an indication of an improperly oriented item or presence of a personal item on the bottom of the storage bin 104, the status is changed to the third status to indicate that the storage bin 104 is full.

The monitor device 108 provides a first portion of the output 134 as signals for the bin status indicator devices 128. The signals indicate the status of the storage bins 104 associated with the corresponding storage bins 104. In a particular implementation, the bin status indicator devices 128 include different color lights (e.g., different colored LEDs) to indicate the status associated with the storage bin 104. For example, the first status is indicated by the color green, the second status is indicated by the color blue, the third status is indicated by the color purple, and the fourth status is indicated by yellow. The signals of the first portion of the output 134 for each storage bin 104 control which color is displayed by the bin status indicator devices 128. In other implementations, different colors or a different type of indicator (e.g., a text display) are used. A bin status indicator device 128 for a storage bin 104 is enabled when the boarding process begins and image data 132 of the interior of the storage bin 104 is received by the monitor device 108. The bin status indicator device 128 is turned off when the boarding process ends (e.g., when the door(s) to the aircraft 106 are closed).

In addition to sending the first portion of the output 134 to the bin status indicator devices 128, the monitor device 108 sends a second portion of the output 134 to one or more portable devices 130 associated with the crew of the aircraft 106. The second portion of the output 134 enables an application on the portable device 130 to display a representation of the storage bins 104 with a corresponding status of each storage bin 104. When a status of a particular storage bin 104 changes to the fourth status, the particular storage bin 104 can be emphasized (e.g., visually distinguished in a display) by the application, and the application can play an audio notice to indicate that there is a problem with the particular storage bin 104.

In some implementations, input from a crew member via the application allows the crew member to set a status of a particular storage bin 104 that overrides the status determined by the monitor device 108. For example, the monitor device 108 determines that the status of a particular storage bin 104 is the second status indicating that space can be made in the particular storage bin 104. A crew member may determine that, although there is a personal item in the storage bin, removal of the personal item will not create enough space for another carry-on item 102. The crew member can use the portable device 130 to override the indicated third status and change the status to another status (e.g., to the first status indicating available space or the fourth status indicating the particular storage bin 104 is full, as appropriate).

In some implementations, the monitor device 108 periodically stores an image that shows the interior of each storage bin 104 to the second image data 154 in the memory 138 during the boarding process. Images of the interiors of the storage bins 104 from the second image data 154 along with information from the passenger data 158 in the memory 138 (e.g., passenger name, seat, and images of items associated with the passenger from the passenger identification information 160) can be examined should the need arise to identify items associated with the passenger or to identify a passenger associated with items.

In some implementations, the first set of cameras 116 remain active until a last passenger is processed by the boarding agent and the last passenger moves out of the boarding area 110. In some implementations, the cameras of the second set of cameras 126 that take images of interiors of the storage bins remain active during the boarding process until corresponding storage bins 104 are closed, and the bin status indicator devices 128 remain active until all storage bins 104 are closed.

Figure 2:
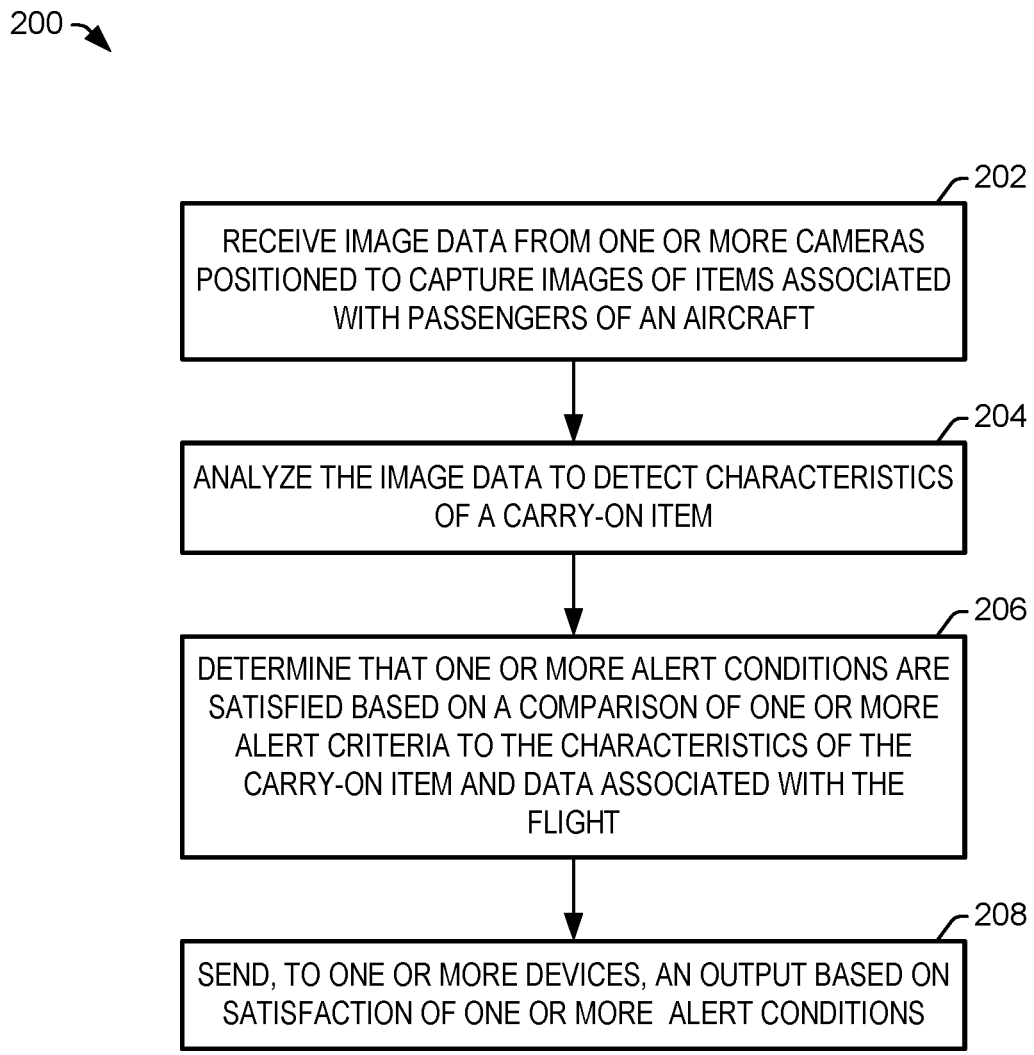
FIG. 2 is a diagram that illustrates a flow chart of a first method of monitoring carry-on items for a flight of an aircraft.

FIG. 2 illustrates a method 200 of monitoring carry-on items for a flight of an aircraft. In a particular implementation, one or more operations of the method 200 are performed by the monitor device 108 of the system 100 of FIG. 1.

The method 200 includes, at block 202, receiving image data 122, 132 from one or more cameras. The one or more cameras may include the first set of cameras 116 in the boarding area 110, the second set of cameras 126 in the aircraft 106, or both. One or more cameras of the first set of cameras 116 are positioned to take images of a passenger and items associated with the passenger as the passenger approaches or arrives at a location where a boarding agent processes the passenger (e.g., at a boarding pass scanning station 112 where the boarding agent scans a boarding pass, visually inspects the passenger and items associated with the passenger, etc.) before allowing the passenger to proceed to the aircraft 106. One or more cameras of the first set of cameras 116 can be coupled to a ceiling, wall, counter, boarding pass scanning station 112, or other structure in the boarding area 110.

Cameras of the second set of cameras 126 are positioned in the aircraft 106 to take images of interiors of open storage bins 104. In an implementation, cameras of the second set of cameras 126 are coupled to bin divider walls, and each camera is positioned to take images of interiors of storage bins across an aisle from the camera. In other implementations, each storage bin 104 includes cameras of the second set of cameras 126 coupled to bin divider walls, a top surface of the storage bin, a door of the storage bin, structural members of the storage bin, other surfaces support surfaces, or combinations thereof, and the cameras are positioned to take images of an interior of the storage bin.

The method 200 includes, at block 204, analyzing image data 122, 132 taken by the one or more cameras to detect characteristics 168 of a carry-on item 102. For example, one or more of the cameras of the first set of cameras 116 in the boarding area 110 for the aircraft 106 is a lidar camera. Image data 122 from the lidar camera is analyzed to determine dimensions (e.g., length, width, and height) of the carry-on item 102. Alternatively or in addition, a region of the boarding area 110 imaged by the one or more cameras of the first set of cameras 116 can include one or more reference markers of the location markers 118. Images of the reference markers and carry-on items in image data 122 taken by two or more cameras at different known locations at, or substantially at, the same time are analyzed to determine dimensions of carry-on items 102.

As another example of determining one or more characteristics of the carry-on item 102, one or more of the cameras of the second set of cameras 126 takes images of the carry-on item 102 when the carry-on item is positioned in a storage bin 104 of the aircraft 106. The storage bin 104 can include one or more position markers, a lidar camera, or both, that enable determination of sizes of items in the storage bin and spacings between items in the storage bin 104. The image data 132 from the one or more cameras is analyzed to determine dimensions of the carry-on item 102 (e.g., a width, a height, a length, or combinations thereof). The dimensions and other information determined from the image data 132 can be saved in the first information 176 in the memory 138 of the monitor device 108.

The method 200 includes, at block 206, determining that one or more alert conditions 170 are satisfied based on a comparison of one or more alert criteria 146 to the characteristics 168 of the carry-on item 102 and aircraft data 144 associated with the aircraft 106. The alert criteria 146 include thresholds and conditions associated with items including carry-on items 102, with storage space, orientation of items in the storage bins 104, and other conditions based on the items. The other alert conditions include safety issues for items associated with passengers, security alerts for items associated with passengers, too many items associated with a passenger, and other conditions.

The method 200 further includes, at block 208, sending an output 124, 134 based on satisfaction of one or more alert conditions 170 to one or more devices 114, 120, 128, 130. The one or more devices are associated with the boarding agent (e.g., a computer device with the monitor 114 at the boarding pass scanning station 112, a portable device associated with the boarding agent, a speaker, the status indicator device 120 visible to the boarding agent, the boarding pass scanning station 112, etc.), bin status indicator devices 128 associated with the storage bins 104, computer devices (e.g., portable devices 130) associated with aircraft crew, other devices, or combinations thereof.

For example, when the monitor device 108 determines that a particular carry-on item is oversized, the monitor device 108 activates the status indicator device 120 and sends a message for display by the monitor 114 associated with the boarding agent. The message informs the boarding agent that the particular carry-on item is oversized and provides selectable options. The selectable options may include a first selectable option that indicates that the particular carry-on item is tagged for storage with checked luggage, a second selectable option (e.g., a dismiss option) that indicates that the boarding agent is allowing the particular carry-on item on the aircraft 106, other options, or combinations thereof. Selection of a particular selectable option by the boarding agent via an input device informs the monitor device 108 of what the boarding agent decides with respect to the particular carry-on item, causes the monitor device 108 to reset the status indicator device 120, and allows the monitor device 108 to store information associated with the particular carry-on item if the particular carry-on item is allowed on the aircraft 106 as a carry-on item 102. Preventing oversize carry-on items from being taken on the aircraft 106 can increase the speed of boarding the passengers and prevent a clogged aisle due to issues associated with placing an oversized item into a storage bin 104.

As another example, security personnel or other airport personnel can enter, into a computer system, an alert describing particular attributes of a particular item that should be located. The monitor device 108 accesses the alert, determines particular alert criteria associated with the alert, and saves the particular alert criteria with the alert criteria 146. The monitor device 108 determines, based on the image data 122, 132, whether an item associated with the passenger has a high probability (e.g., 90 percent or greater than some other percentage) of being the particular item. If the monitor device 108 determines that a threshold probability is met, the monitor device 108 sends a message to the monitor 114 and a signal to the status indicator device 120 to alert the boarding agent to a potential issue. The message describes the alert and provides selectable response options for the boarding agent. The selectable response options can include an option to notify security, an option to dismiss the alert based on the boarding agent determining that the item associated with the passenger is not the particular item, other options, or combinations thereof.

As another example, the monitor device 108 keeps track of a number of carry-on items 102 allowed past the boarding agent to the aircraft 106 and saves the information in carry-on data 156. When an alert condition based on the carry-on data 156 indicates a lack available storage space in the storage bins 104 (e.g., less than a threshold amount available storage space), a signal is sent to the boarding agent to indicate that remaining carry-on items 102 for passengers not yet past the boarding agent should be tagged for storage with checked luggage. In some implementations, the monitor device can provide to the monitor 114 a count of a number of carry-on items 102 allowed past the boarding agent, a count of carry-on items 102 in the storage bins 104, and an estimated count of spaces for carry-on items 102 in the storage bins 104 of the aircraft 106 based on the image data 132 from the second set of cameras 126. Should the estimated count of spaces for carry-on items 102 start to approach zero (e.g., become six or less) with more passengers remaining to board than the estimated count of spaces, the boarding agent can communicate with the aircraft crew to determine if extra carry-on space can be created by rearranging the carry-on items 102 already positioned in the storage bins 104, and can provide a notice to passengers waiting to board that the passengers may have to have their carry-on items 102 tagged and stored with checked luggage.

As another example, the monitor device 108 determines that an alert condition 170 is satisfied when one or more carry-on items 102 are in an improper orientation in a storage bin 104, or when a small item (e.g., personal item, a clothing item, etc.) is placed in the storage bin 104 where a carry-on item 102 could be placed instead. The monitor device 108 sends a first portion of the output 134 to change a bin status indicator device 128 for the storage bin 104 from a first color that indicates available storage space in the storage bin 104 (e.g., the color green) to a second color that indicates that extra space can be made in the storage bin 104 (e.g., the color blue), and sends a second portion of the output 134 to the portable device 130 indicating that additional space can be made in the storage bin 104. Based on the first portion of the output 134 or the second portion of the output 134, an improperly oriented carry-on item 102 can be repositioned to a proper orientation, the small item can be positioned on top of other carry-on items 102 or removed from the storage bin 104 for placement in a seat pocket or in the floor by the seat of the passenger associated with the small item. Proper orientation of carry-on items 102 and removal of small items from places where carry-on items 102 can be placed in the storage bins 104 can allow a number of carry-on items 102 loaded in the storage bins to be maximized.

As another example, the monitor device 108 determines that an alert condition 170 is satisfied when image data 132 indicates that space between items (e.g., carry-on items 102, safety equipment, other items, or combinations thereof) in a storage bin 104 is less than a threshold (e.g., a height threshold of allowed carry-on items). In response, the monitor device 108 sends a first portion of the output 134 to change the bin status indicator device 128 for the storage bin 104 from the color indicating available space in the storage bin 104 to another color that indicates that the storage bin 104 is full (i.e., purple) and sends a second portion of the output 134 as a message to the portable device 130. In response to the change of the bin status indicator device 128 or the message, the storage bin 104 can be closed.

As a further example, the monitor device 108 determines that an alert condition 170 is satisfied when the image data 132 indicates that a problem is associated with a storage bin 104. The problem may be that an item in the storage bin 104 will prevent the storage bin 104 from closing, that an item is placed on or in front of safety equipment or other reserved area in the storage bin 104, that something is hanging out of the storage bin 104, another problem, or a combination thereof. In response, the monitor device 108 sends a first portion of the output 134 to change the color of the bin status indicator device 128 to a color indicating a problem (e.g., the color yellow) and sends a second portion of the output 134 as a message to the portable device 130. In response, a member of the aircraft crew can go to the storage bin 104 and fix the problem.

Figure 3:
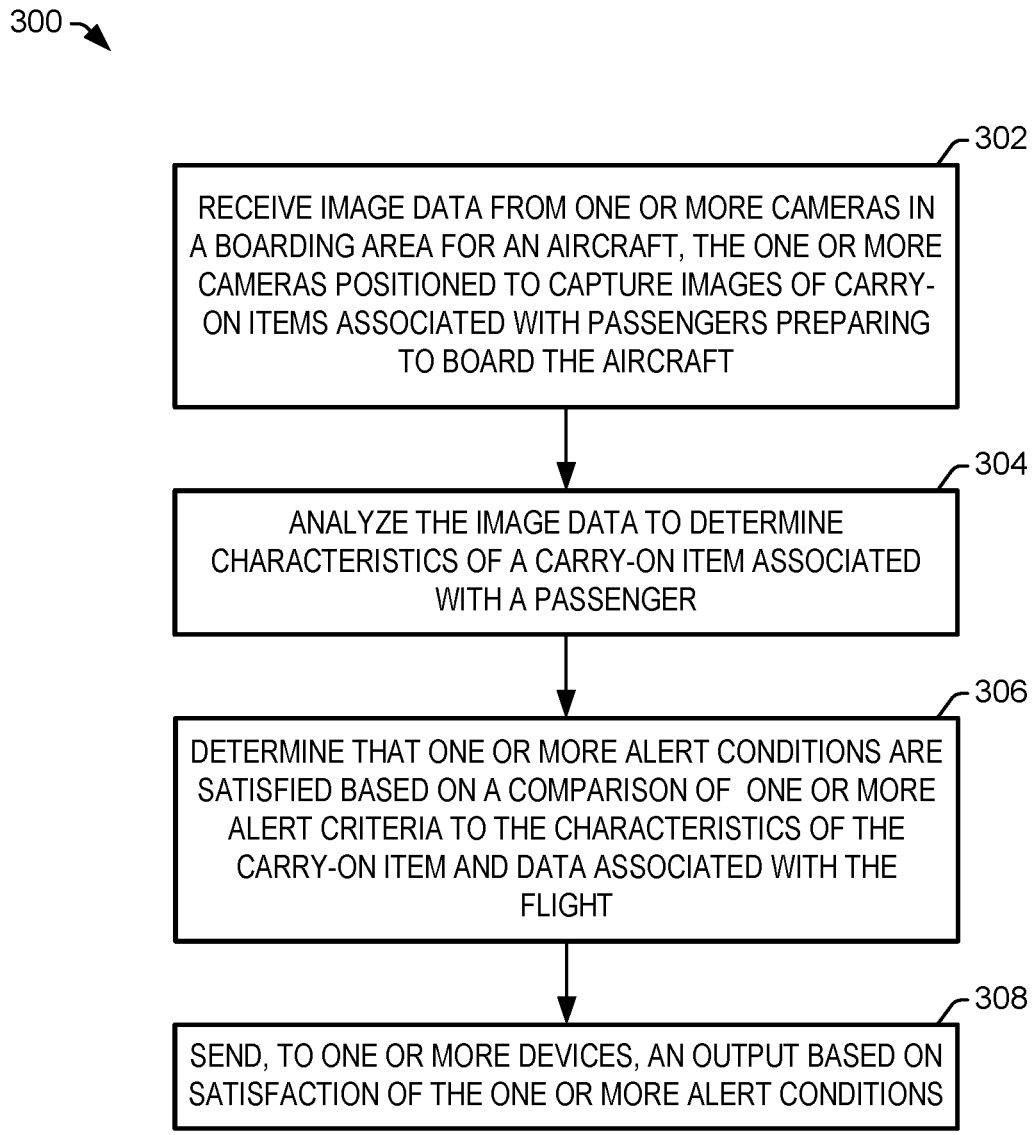
FIG. 3 is a diagram that illustrates a flow chart of a method of monitoring storage bins on an aircraft.

FIG. 3 illustrates a method 300 of monitoring carry-on items 102 for a flight of an aircraft 106. In a particular implementation, one or more operations of the method 300 are performed by the monitor device 108 of the system 100 of FIG. 1.

The method 300, at block 302, includes receiving image data 122 from one or more cameras 116 in a boarding area 110 for the aircraft 106. The one or more cameras 116 are positioned to capture images of items associated with passengers preparing to board the aircraft 106, where the items include carry-on items 102. The one or more cameras 116 are coupled to a ceiling, a wall, a counter, a boarding pass scanning station 112, other structure, or combinations thereof, in the boarding area 110. In some implementations, the one or more cameras 116 include one or more digital video cameras configured to stream content to the monitor device 108, one or more lidar cameras, one or more digital cameras controlled by one or more timers to capture images at periodic intervals (e.g., once every second), or combinations thereof.

The method 300 includes, at block 304, analyzing image data 122 taken by the one or more cameras 116 to determine characteristics 168 of a carry-on item 102 associated with a passenger. The characteristics 168 can include dimensions of the carry-on item 102 and other information. For example, one or more of the cameras 116 in the boarding area 110 for the aircraft 106 is a lidar camera. Image data from the lidar camera is used to determine dimensions (e.g., length, width, and height) of the carry-on item 102. Alternatively or in addition, a region of the boarding area 110 imaged by the one or more cameras 116 can include one or more markers of the location markers 118. The location markers 118 identify the positions of the one or more markers and the one or more cameras 116. Images of the markers in the image data 122 taken by two or more of the cameras of the one or more cameras 116 at, or substantially at, the same time are used to determine dimensions of the carry-on items 102.

When determining the dimensions of the carry-on item 102, certain features of the carry-on item 102 can be ignored. For example, many carry-on items 102 are roller bags with an extendable/retractable handle. When determining a length of a roller bag with an extendable/retractable handle, the length of the extendable/retractable handle is ignored. Also, when determining a length of a carry-on item 102, if an initial determination is that the length exceeds a length threshold, an additional determination is performed to determine if the carry-on item 102 is two or more items on top of each other. For example, a passenger can place a personal item (i.e. a computer bag) on top of a roller bag. The length of the roller bag and personal item combination can exceed the threshold length. The additional determination results in the length of the carry-on item 102 being only the length of the roller bag.

At the boarding pass scanning station 112, a boarding agent processes a passenger. Processing the passenger can include scanning a boarding pass of the passenger and observing the passenger and items associated with the passenger to determine if something associated with the passenger should be addressed before allowing the passenger to board the aircraft 106. Data associated with passengers, image data 122 of items associated with the passengers, data for the boarding process of the aircraft (e.g., video data), additional data, or combinations thereof, can be associated with the flight and stored in a database in the monitor device 108 or in one or more databases external to the monitor device.

The information in the database for the flight can be accessed if a problem occurs. For example, if a person that boarded the aircraft 106 subsequently leaves the aircraft 106 before departure of the aircraft 106, the information in the database for the flight can be accessed to make sure that the items associated with the person are removed from the aircraft 106. As another example, if an item is left on the aircraft 106 and subsequently discovered after passengers have left the aircraft 106, the information in the flight database for the flight can be accessed to identify information associated with the appropriate passenger to facilitate return of the item to the appropriate passenger.

The information in the database for the flight is stored in the database for a particular amount of time, and after passage of the particular amount of time, the information is deleted or allowed to be overwritten. The particular amount of time can be an hour, a day, a week, or some other amount of time from an arrival of the aircraft 106 at a destination or some other period of time. If needed, and before expiration of the particular amount of time, authorized personnel can inhibit the information in the database for the flight from being deleted or overwritten, or make a copy of the information in the database for the flight and store the copy in a location that will not be deleted after passage of the particular amount of time, so that the information is available past the particular amount of time.

The method 300 includes, at block 306, determining that one or more alert conditions 170 are satisfied based on a comparison of one or more alert criteria 146 to the characteristics 168 of the carry-on item 102 and aircraft data 144 associated with the aircraft 106. The alert criteria 146 include size limits (e.g., a length threshold, a width threshold, and a height threshold) for the carry-on item 102, a threshold number of items associated with a passenger, other thresholds for other conditions. For example, the alert criteria 146 may include a threshold number of carry-on items allowable onboard the aircraft 106. For the flight, the type of the aircraft 106 and storage space available in storage bins 104 for the aircraft 106 is known. The threshold number can be a set value (i.e., 112 carry-on items 102) or can be dynamically calculated based on the dimensions of carry-on items 102 already allowed on the aircraft 106 and based on the total storage space of the overhead bins 104. Alternatively or in addition, the threshold number can be based on a determination of remaining available space by the monitor device 108 based on image data 132 received from cameras 126 on the aircraft 106 that provide particular image data of interiors of the storage bins 104.

The method 300 further includes, at block 308, sending an output based on satisfaction of one or more alert conditions 170 to at least one device. For example, when the satisfied alert condition 170 indicates that the carry-on item 102 is oversized, that the passenger is associated with more than the threshold number of items, or both; the monitor device 108 sends a first portion of the output 124 as an alert to the status indicator device 120 and a second portion of the output 124 as a message displayable by the monitor 114. In response to satisfaction of the alert condition 170 indicating an oversize carry-on item, the boarding agent can determine whether to tag the oversize carry-on item for transport with checked luggage or whether to allow the oversize carry-on item onto the aircraft 106 with the passenger. The boarding agent can input data regarding the status of the oversize carry-on item to the monitor device 108 via an input device associated with the monitor 114. In response to the alert condition 170 indicating too many items associated with the passenger, the boarding agent acknowledges the alert condition and the boarding agent can have the passenger reduce the number of items by placing one or more items in another item (e.g., placing a first item in the carry-on item 102), pay a fee for additional items, or the boarding agent can ignore the alert condition and allow the passenger to board the aircraft 106.

Figure 4:
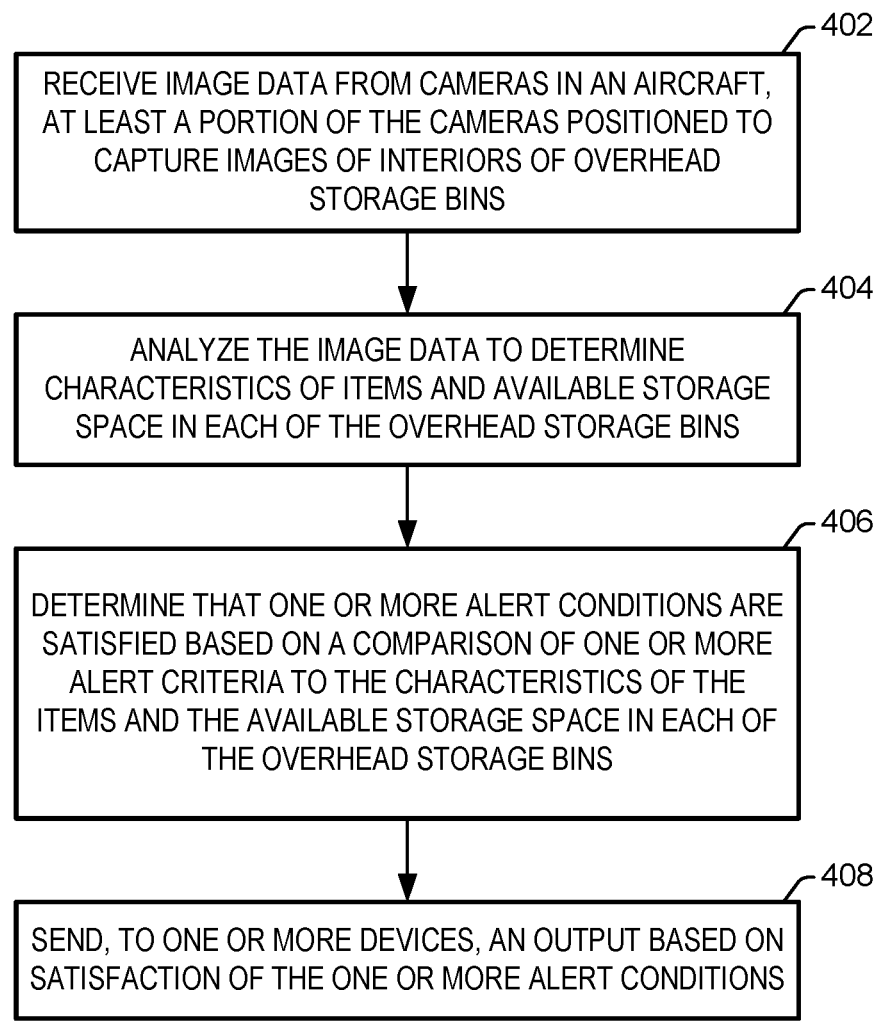
FIG. 4 is a diagram that illustrates a flow chart of a second method of monitoring carry-on items for a flight of an aircraft.

FIG. 4 illustrates a method 400 of monitoring carry-on items for a flight of an aircraft 106. In a particular implementation, one or more operations of the method 400 are performed by the monitor device 108 of the system 100 of FIG. 1. Initially, the monitor device 108 receives input indicating that a boarding process for the flight has started. In response to the start of the boarding process, the monitor device 108 enables activation of cameras 126 in the aircraft 106 and enables activation of bin status indicator devices 128 for each storage bin 104 of the aircraft 106. A first portion of the cameras are positioned to capture images of interiors of the storage bins 104.

A camera of the first portion of cameras may be activated when the storage bin 104 associated with the camera is open. A bin status indicator device 128 for the storage bin 104 is activated when the monitor device 108 is able to determine a status of the storage bin 104 from image data 132 received from one or more cameras associated with the storage bin 104. In a particular implementation, the bin status indicator device 128 indicates the status of a storage bin 104 by emitting a particular color of light. For example, in an implementation, a green light indicates available storage space, a blue light indicates that additional space can be made in the storage bin 104 by rearranging items in the storage bin 104, a purple light indicates that the storage bin 104 is full, and a yellow light (e.g., an amber light) indicates a problem with the storage bin 104. In other implementations, different color schemes may be used, fewer lights may be used, additional lights may be used to indicate other status conditions, or combinations thereof. In still other implementations, different indications methods are used, such as a display of text indicating the status.

The method 400 includes, at block 402, receiving image data 132 from cameras 126 in the aircraft 106. At least the first portion of the cameras 126 are positioned to capture images of interiors of storage bins 104. In some implementations, another portion of the cameras 126 are positioned to capture images of passengers in the aircraft 106 as the passengers stow items and go to their seats in the aircraft 106. The cameras 126 can be video cameras, one or more still image cameras controlled by one or more timers to periodically take images, lidar cameras, other types of cameras, or combinations thereof.

The method 400 includes, at block 404, analyzing the image data 132 to determine first information 176 in each of the storage bins 104. The first information 176 includes item characteristics and storage space in a storage bin 104. The first information includes types of items in the storage bin 104, dimensions of items stored in the storage bins 104, orientation information for items stored in the storage bins, remaining space for items in the storage bins 104, positions of items relative to edges of the storage bins 104 and safety equipment, positions of items relative to moving parts and door fasteners of the storage bins 104, other characteristics, or combinations thereof. For example, the monitor device 108 determines a width and a height of an item placed on a bottom of the storage bin 104 based on the image data 132 from the cameras 126. Based on the width and height of the item, a ratio of the width to the height, other factors, or combinations thereof, the monitor device 108 determines whether the item is a carry-on item 102 or a different type of item (e.g., a personal item, a coat or other article of clothing, etc.) that does not need to be stowed in the storage bin 104.

As another example, the monitor device 108 determines the orientation information for the item in the storage bin 104 based on a comparison of a first dimension of the item along a length of the storage bin compared to a second dimension of the item along a height of the storage bin. As a further example, the monitor device 108 determines available storage space in the storage bin 104 as a length of the storage bin, less a length of unusable space (e.g., a length occupied by safety equipment), and less a sum of first dimensions of items in the storage bin 104 along the length of the storage bin 104.

The method 400 includes, at block 406, determining that one or more alert conditions 170 are satisfied based on a comparison of one or more alert criteria 146 to the first information 176 for each of the storage bins 104. The monitor device 108 determines that an alert condition 170 is satisfied when one or more carry-on items 102 are in an improper orientation in an storage bin 104, when a small item (e.g., personal item, a clothing item, etc.) is placed in the storage bin 104 where a carry-on item 102 could be placed instead, when enough space can be made for an additional carry-on item 102 by moving items in the storage bin 104 closer together, when there is insufficient space in the storage bin 104 for another carry-on item 102 (i.e., the storage bin is full), etc.

The method 400 also includes, at block 408, sending, to one or more devices, output 134 based on satisfaction of the one or more alert conditions 170. The output 134 can be signals to one or more of the bin status indicator devices 128, information to the portable device 130, other output, or combinations thereof.

Figure 5:
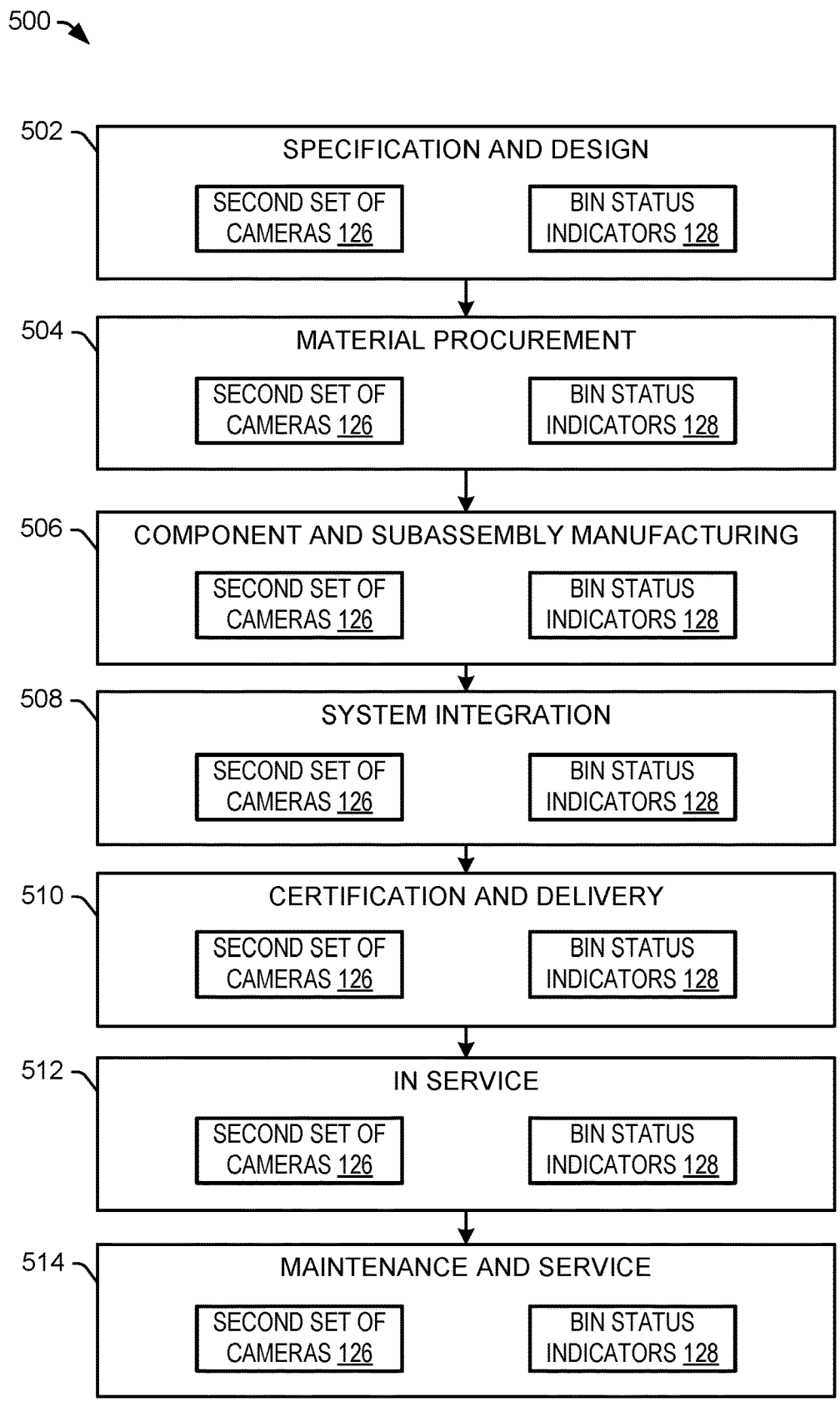
FIG. 5 is a flow chart illustrating a life cycle of an aircraft that is configured to monitor storage of carry-on items in storage bins of the aircraft.

Referring to FIG. 5, a flowchart illustrative of a life cycle of an aircraft that is configured to monitor storage of items in storage bins of the aircraft is shown and designated 500. During pre-production, the exemplary method 500 includes, at block 502, specification and design of an aircraft, such as the aircraft 106 described with reference to FIG. 6. During specification and design of the aircraft, the method 500 may include specification and design of a second set of cameras 126 to monitor passengers moving to their seats during a boarding process, to monitor interiors of storage bins 104, or both. During the specification and design of the aircraft, at block 502, the method 500 may include specification and design of bin status indicator devices 128 for each of the storage bins 104. At block 504, the method 500 includes material procurement, which may include procuring the second set of cameras 126 and the bin status indicator devices 128, and needed accessories (e.g., wiring, power connections, etc.).

During production, the method 500 includes, at block 506, component and subassembly manufacturing and, at block 508, system integration of the aircraft. For example, the method 500 may include component and subassembly manufacturing of the second set of cameras 126 and the bin status indicator devices 128. At block 510, the method 500 includes certification and delivery of the aircraft and, at block 512, placing the aircraft in service. Certification and delivery may include certification of operation of the second set of cameras 126 and the bin status indicator devices 128 with other systems of the aircraft. While in service by a customer, the aircraft may be scheduled for routine maintenance and service (which may also include modification, reconfiguration, refurbishment, and so on). At block 514, the method 500 includes performing maintenance and service on the aircraft, which may include performing maintenance and service on the second set of cameras 126 and the bin status indicator devices 128.

Each of the operations of the method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 106 as shown in FIG. 6.

Figure 6:
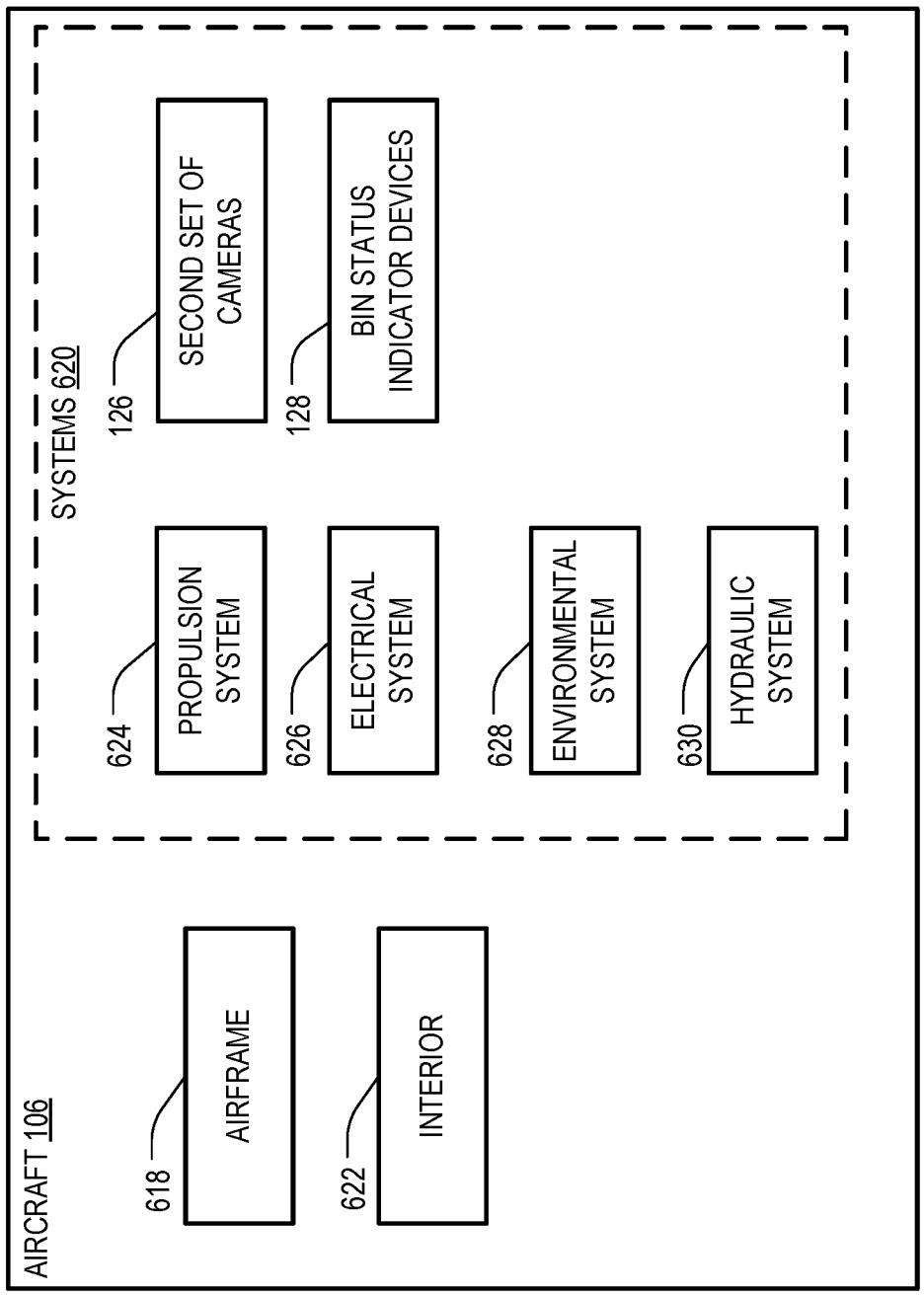
FIG. 6 is a diagram of an aircraft configured to monitor storage of carry-on items in storage bins of the aircraft.

In the example of FIG. 6, the aircraft 106 includes an airframe 618 with a plurality of systems 620 and an interior 622. Examples of the plurality of systems 620 include one or more of a propulsion system 624, an electrical system 626, an environmental system 628, and a hydraulic system 630. Any number of other systems may be included, such as the second set of cameras 126, the bin status indicator devices 128, or both.

Figure 7:
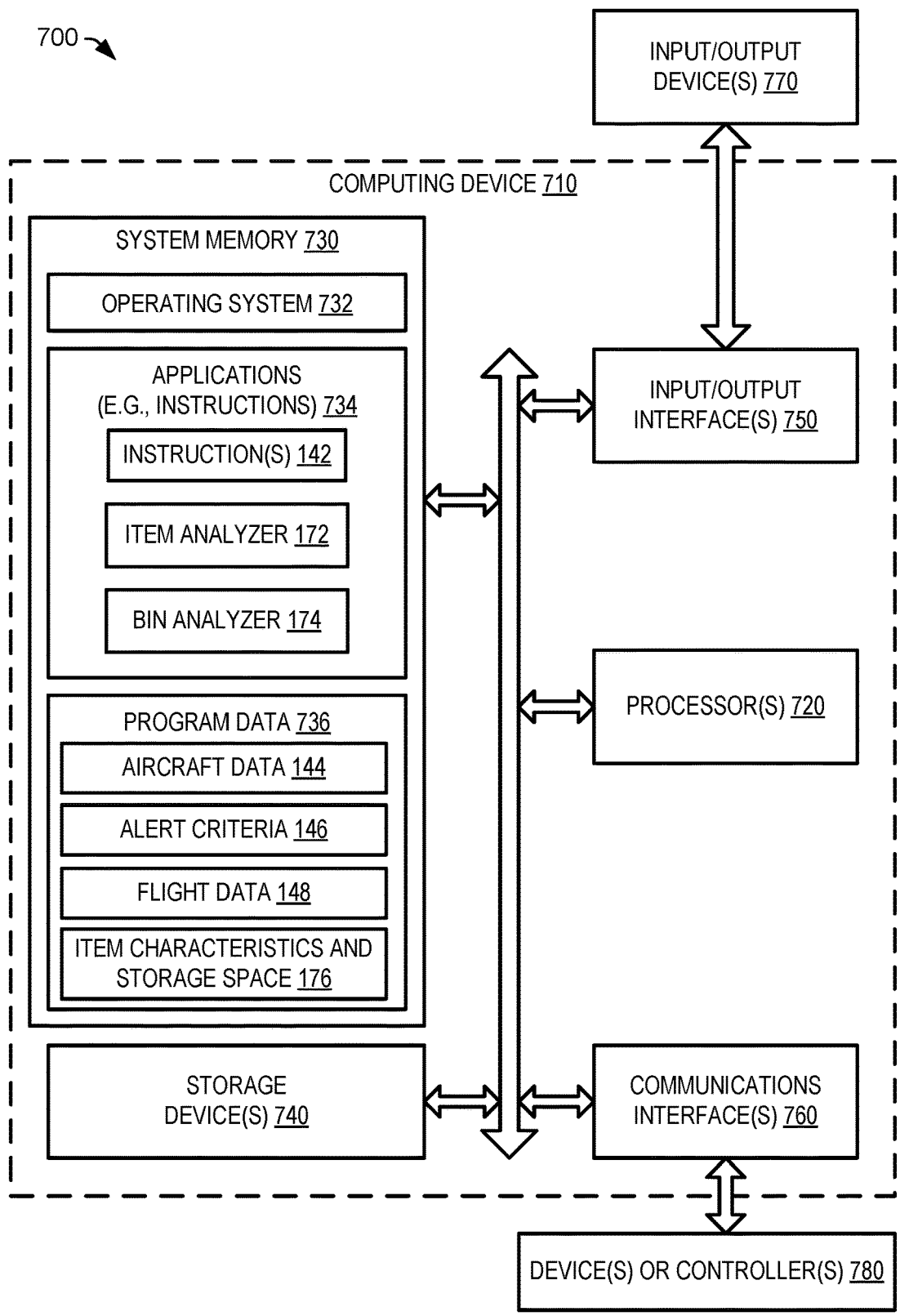
FIG. 7 is a block diagram of a computing environment including a computing device configured to support aspects of computer-implemented methods and computer-executable program instructions (or code) according to the present disclosure.

FIG. 7 is a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6. In a particular aspect, the computing device 710 includes the monitor device 108, the boarding pass scanning station 112, cameras of the first set of cameras 116, particular location markers of the location markers 118, cameras of the second set of cameras 126, and the portable device 130 of FIG. 1, one or more servers, one or more virtual devices, or a combination thereof.

The computing device 710 includes one or more processors 720. In a particular aspect, the processor 720 corresponds to the processor 140 of FIG. 1. The processor 720 is configured to communicate with system memory 730, one or more storage devices 740, one or more input/output devices 770 via one or more input/output interfaces 750, one or more communications interfaces 760, or any combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores system (program) data 736, such as the aircraft data 144, the alert criteria 146, the flight data 148, and the first information 176 (e.g., item characteristics and storage space in an overhead storage bin 104) of FIG. 1.

The system memory 730 includes one or more applications 734 (e.g., sets of instructions) executable by the processor(s) 720. As an example, the one or more applications 734 include the instructions 142, the item analyzer 172, and the bin analyzer 174 executable by the processor(s) 720 to initiate, control, or perform one or more operations described with reference to FIGS. 1-6.

In a particular implementation, the system memory 730 includes a non-transitory, computer readable medium (e.g., a computer-readable storage device) storing the instructions 142 that, when executed by the processor(s) 720, cause the processor(s) 720 to initiate, perform, or control operations to monitor storage of carry-on items in storage bins of an aircraft. The operations include receiving image data from one or more cameras. The operations include analyzing the image data to determine characteristics of a carry-on item. The operations include determining that one or more alert conditions are satisfied based on a comparison of one or more alert criteria to the characteristics of the carry-on item and data associated with the aircraft. The operations also include sending an output based on satisfaction of the one or more alert conditions to one or more devices.

The one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications (e.g., one or more of the applications 734), and program data (e.g., the program data 736). In a particular aspect, the system memory 730, the storage devices 740, or both, include tangible computer-readable media. In a particular aspect, one or more of the storage devices 740 are external to the computing device 710.

The one or more input/output interfaces 750 that enable the computing device 710 to communicate with one or more input/output devices 770 to facilitate user interaction. For example, the one or more input/output interfaces 750 can include a display interface, an input interface, or both. For example, the input/output interface 750 is adapted to receive input from a user, to receive input from another computing device, or a combination thereof. In some implementations, the input/output interface 750 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 770 includes one or more user interface devices and displays, including some combination of buttons, keyboards, pointing devices, displays, speakers, microphones, touch screens, and other devices.

The processor(s) 720 are configured to communicate with devices or controllers 780 via the one or more communications interfaces 760. For example, the one or more communications interfaces 760 can include a network interface. The devices or controllers 780 can include, for example, the monitor device 108, the monitor 114, cameras of the first set of cameras 116, the status indicator device 120, cameras of the second set of cameras 126, the bin status indicator devices 128 of FIG. 1, or combinations thereof.

In some implementations, a non-transitory, computer readable medium (e.g., a computer-readable storage device) stores instructions that, when executed by one or more processors, cause the one or more processors to initiate, perform, or control operations to perform part or all of the functionality described above. For example, the instructions may be executable to implement one or more of the operations or methods of FIGS. 1-6. In some implementations, part or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Further, the disclosure comprises embodiments according to the following clauses:

Clause 1. A system 100 of monitoring carry-on items 102 for a flight of an aircraft 106, the system 100 comprising: one or more cameras 116, 126 positioned to capture images of the carry-on items 102 associated with passengers of the aircraft 106; an interface 136 configured to receive image data 122, 132 from the one or more cameras 116, 126; and one or more processors 140 coupled to the interface 136 and configured to: analyze the image data 122, 132 to determine characteristics 168 of a carry-on item 102; determine that one or more alert conditions 170 are satisfied based on a comparison of one or more alert criteria 146 to the characteristics 168 of the carry-on item 102 and data 144 associated with the aircraft 106; and send an output 124, 134 based on satisfaction of the one or more alert conditions 170 to one or more devices 114, 120, 128, 130.

Clause 2. The system 100 of clause 1, wherein the one or more cameras 116, 126 comprise one or more cameras of a first set of cameras 116 positioned to capture images of carry-on items 102 in a boarding area 110 for the aircraft 106.

Clause 3. The system 100 of any of clauses 1 and 2, wherein the one or more cameras 116, 126 comprise one or more cameras of a second set of cameras 126 positioned to capture images of interiors of storage bins 104 of the aircraft 106.

Clause 4. The system 100 of any of clauses 1 to 3, wherein an alert criterion of the one or more alert criteria 146 corresponds to the carry-on item 102 being oversized based on dimensions of the carry-on item 102 determined from the image data 122, 132, and wherein the output 124, 134 is provided to a device 114, 120 associated with a boarding agent in response to the carry-on item 102 being oversized.

Clause 5. The system 100 of any of clauses 1 to 4, wherein an alert criteria of the one or more alert criteria 146 corresponds to a lack of a threshold amount of available storage space in storage bins 104 of the aircraft 106 based on information obtained from the image data 122, 132, and wherein the output 124, 134 is provided to a device 114, 120 associated with a boarding agent in response to the lack of the threshold amount of available storage space in the storage bins 104.

Clause 6. The system 100 of clause 5, wherein a determination of the lack of the threshold amount of available storage space in the storage bins 104 is based on aircraft data 144 associated with the aircraft 106 and a number of carry-on items 102 allowed to pass from a boarding area 110 to the aircraft 106, 156.

Clause 7. The system 100 of clause 5, wherein a determination of the lack of the threshold amount of available storage space in the storage bins 104 is further based on image data 132 of interiors of the storage bins 104 captured by particular cameras of the one or more cameras 126.

Clause 8. The system 100 of any of clauses 1 to 7, wherein an alert criteria of the one or more alert criteria 146 is associated with a particular storage bin 104, and wherein the output 124, 134 comprises information sent to a device 130 associated with a crew member of the aircraft 106, a signal to activate a bin status indicator device 128 associated with the particular storage bin 104, or both.

Clause 9. The system 100 of clause 8, wherein a color of the bin status indicator device 128 is associated with a particular status of the particular storage bin 104.

Clause 10. A method 400 of monitoring carry-on items 102 for a flight of an aircraft 106, the method 400 comprising: receiving 402, at a monitor device 108, image data 132 from cameras 126 onboard the aircraft, at least a portion of the cameras positioned to capture images of interiors of storage bins 104 for carry-on items 102; analyzing 404, at the monitor device 108, the image data 132 to determine first information 176, the first information 176 comprising characteristics of items in each of the storage bins 104 and comprising available storage space in each of the storage bins 104; determining 406, at the monitor device 108, that one or more alert conditions 170 are satisfied based on a comparison of one or more alert criteria 146 to the first information 176; and sending 408, from the monitor device 108 to one or more devices 128, 130, an output 134 based on satisfaction of the one or more alert conditions 170.

Clause 11. The method 400 of clause 10, wherein analyzing 404 the image data 132 further comprises determining a status associated with each storage bin 104, and wherein sending 408 the output 134 includes sending a signal to change a color of a bin status indicator device 128 of a storage bin 104 to indicate a status associated with the storage bin 104.

Clause 12. The method 400 of clause 11, wherein analyzing 404 the image data 132 comprises determining that the status is a first status in response to the storage bin 104 having available space, and wherein analyzing 404 the image data 132 comprises determining that the status is a third status indicating that the storage bin 104 is full in response to the storage bin 104 having less than a threshold amount of available storage space.

Clause 13. The method 400 of clause 11, wherein analyzing 404 the image data 132 comprises determining that the status is a second status in response to dimensions of an item placed in a particular storage bin 104 corresponding to dimensions associated with a personal item 178.

Clause 14. The method 400 of clause 11, wherein analyzing 404 the image data 132 comprises determining that the status is a fourth status in response to one or more items positioned in the storage bin 104 inhibiting the storage bin 104 from closing.

Clause 15. The method 400 of any of clauses 10 to 14, wherein analyzing 404 the image data 132 further comprises determining available storage space in the storage bins 104, and wherein sending 408 the output 103 comprises sending a message to a device 114 associated with a boarding agent indicating a number of additional carry-on items storable in the storage bins 104.

Clause 16. A method 300 of monitoring carry-on items 102 for a flight of an aircraft 106, the method 300 comprising: receiving 302, at a monitor device 108, image data 122 from one or more cameras 116 in a boarding area 110 for the aircraft 106, the one or more cameras 116 positioned to capture images of carry-on items 102 associated with passengers preparing to board the aircraft 106; analyzing 304, at the monitor device 108, the image data 122 to determine characteristics 168 of a carry-on item 102 associated with a passenger; determining 306, at the monitor device 108, that one or more alert conditions 170 are satisfied based on a comparison of one or more alert criteria 146 to the characteristics 168 of the carry-on item 102 and data 144 associated with the aircraft 106; and sending 308, from the monitor device 108 to one or more devices 114, 120, an output 124 based on satisfaction of the one or more alert conditions 170.

Clause 17. The method 300 of clause 16, wherein the characteristics 168 include estimates of a length, a width, and a height of the carry-on item 102.

Clause 18. The method 300 of clause 17, wherein the output 124 comprises an indication that the carry-on item 102 is oversized based on one or more of the length, the width, or the height exceeding one or more corresponding dimension thresholds of the one or more alert criteria 146 for allowable dimensions of carry-on items 102.

Clause 19. The method 300 of clause 17, wherein estimating the length comprises determining a first length of the carry-on item 102, and in response to the first length exceeding a threshold, determining whether the first length is associated with two or more separate items; and, responsive to determining that the first length is associated with two or more separate items, estimating the length as a length associated with a longest of the two or more separate items.

Clause 20. The method 300 of any of clauses 16 to 20, wherein the one or more alert criteria 146 correspond to a lack of a threshold amount of storage space in storage bins 104 of the aircraft 106, and wherein satisfaction of an alert condition of the one or more alert conditions 170 relating to a lack of a threshold amount of storage space is based on second image data 134 received from the aircraft 106.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system of monitoring carry-on items for a flight of an aircraft, the system comprising:
    cameras positioned to capture images of carry-on items associated with passengers of the aircraft;
    an interface configured to receive image data from the cameras, wherein the cameras include a first set of cameras and a second set of cameras, the second set of cameras positioned to capture images of interiors of storage bins of the aircraft; and
    one or more processors coupled to the interface and configured to:
        analyze the image data to determine first information comprising characteristics of a carry-on item, wherein the first information of each item includes a first dimension corresponding to a longest length of the item in a direction parallel to a bottom of a storage bin and a second dimension corresponding to a longest length of the item in a direction parallel to a side of the storage bin;
        determine that one or more alert conditions are satisfied based on a comparison of one or more alert criteria to the characteristics of the carry-on item and data associated with the aircraft, wherein a first alert condition of the one or more alert conditions indicates that additional space can be made in a particular storage bin by reorienting a particular item responsive to a ratio of the first dimension of the particular item to the second dimension of the particular item being greater than a threshold; and
        send an output based on satisfaction of the one or more alert conditions to one or more devices, wherein the output includes a message to a portable device associated with a crew member of the aircraft in response to satisfaction of the first alert condition.

2. The system of claim 1, wherein the first set of cameras are positioned to capture images of carry-on items in a boarding area for the aircraft.

3. The system of claim 1, wherein a second alert condition of the one or more alert conditions indicates that a particular storage bin is unable to close.

4. The system of claim 1, wherein an alert criterion of the one or more alert criteria corresponds to the carry-on item being oversized based on dimensions of the carry-on item determined from the image data, and wherein the output is provided to a device associated with a boarding agent in response to the carry-on item being oversized.

5. The system of claim 1, wherein an alert criteria of the one or more alert criteria corresponds to a lack of a threshold amount of available storage space in storage bins of the aircraft based on information obtained from the image data, and wherein the output is provided to a device associated with a boarding agent in response to the lack of the threshold amount of available storage space in the storage bins.

6. The system of claim 5, wherein a determination of the lack of the threshold amount of available storage space in the storage bins is based on aircraft data associated with the aircraft and a number of carry-on items allowed to pass from a boarding area to the aircraft.

7. The system of claim 6, wherein a determination of the lack of the threshold amount of available storage space in the storage bins is further based on the images of interiors of the storage bins.

8. The system of claim 1, wherein an alert criteria of the one or more alert criteria is associated with a particular storage bin, and wherein the output comprises information sent to a device associated with a particular crew member of the aircraft, a signal to activate a bin status indicator device associated with the particular storage bin, or both.

9. The system of claim 8, wherein a color of the bin status indicator device is associated with a particular status of the particular storage bin.

10. A method of monitoring carry-on items for a flight of an aircraft, the method comprising:
   receiving, at a monitor device, image data from cameras onboard the aircraft, at least a portion of the cameras positioned to capture images of interiors of storage bins for carry-on items;
   analyzing, at the monitor device, the image data to determine first information, the first information comprising characteristics of items in each of the storage bins and comprising available storage space in each of the storage bins, wherein the first information of each item includes a first dimension corresponding to a longest length of the item in a direction parallel to a bottom of a storage bin and a second dimension corresponding to a longest length of the item in a direction parallel to a side of the storage bin;
   determining, at the monitor device, that one or more alert conditions are satisfied based on a comparison of one or more alert criteria to the first information, wherein a first alert condition of the one or more alert conditions indicates that additional space can be made in a particular storage bin by reorienting a particular item responsive to a ratio of the first dimension of the particular item to the second dimension of the particular item being greater than a threshold; and
   sending, from the monitor device to one or more devices, an output based on satisfaction of the one or more alert conditions, wherein the output includes a message to a portable device associated with a crew member of the aircraft in response to satisfaction of the first alert condition.

11. The method of claim 10, wherein analyzing the image data further comprises determining a status associated with each storage bin, and wherein sending the output includes sending a signal to change a color of a bin status indicator device of a storage bin to indicate a status associated with the storage bin.

12. The method of claim 11, wherein analyzing the image data comprises determining that the status is a first status in response to the storage bin having available space, and wherein analyzing the image data comprises determining that the status is a third status indicating that the storage bin is full in response to the storage bin having less than a threshold amount of available storage space.

13. The method of claim 11, wherein analyzing the image data comprises determining that the status is a second status in response to dimensions of an item placed in a particular storage bin corresponding to dimensions associated with a personal item.

14. The method of claim 11, wherein analyzing the image data comprises determining that the status is a fourth status in response to one or more items positioned in the storage bin inhibiting the storage bin from closing.

15. The method of claim 10, wherein analyzing the image data further comprises determining available storage space in the storage bins, and wherein sending the output comprises sending a message to a device associated with a boarding agent indicating a number of additional carry-on items storable in the storage bins.

16. A non-transitory computer-readable medium comprising instructions that, when executed by one or more processors, cause the one or more processors to:
   receive image data from one or more cameras onboard an aircraft, at least a portion of the cameras positioned to capture images of interiors of storage bins for carry-on items;
   analyze the image data to determine first information, the first information comprising characteristics of, wherein the first information of each item includes a first dimension corresponding to a longest length of the item in a direction parallel to a bottom of a storage bin and a second dimension corresponding to a longest length of the item in a direction parallel to a side of the storage bin;
   determine that one or more alert conditions are satisfied based on a comparison of one or more alert criteria to the first information, wherein a first alert condition of the one or more alert conditions indicates that additional space can be made in a particular storage bin by reorienting a particular item responsive to a ratio of the first dimension of the particular item to the second dimension of the particular item being greater than a threshold; and
   send an output based on satisfaction of the one or more alert conditions, wherein the output includes a message to a portable device associated with a crew member of the aircraft in response to satisfaction of the first alert condition.

17. The non-transitory computer-readable medium of claim 16, wherein the characteristics include estimates of a length, a width, and a height of each carry-on item.

18. The non-transitory computer-readable medium of claim 17, wherein the output comprises an indication that a particular carry-on item is oversized based on one or more of the length, the width, or the height of the particular carry-on item exceeding one or more corresponding dimension thresholds of the one or more alert criteria for allowable dimensions of carry-on items.

19. The non-transitory computer-readable medium of claim 17, wherein estimating the length comprises:

determining a first length of the carry-on item; and
responsive to the first length exceeding a threshold and responsive to a particular determination indicating that the carry-on item includes two or more separate items, estimating the length as a particular length associated with a longest of the two or more separate items.

20. The non-transitory computer-readable medium of claim 16, wherein the one or more alert criteria correspond to a lack of a threshold amount of storage space in storage bins of the aircraft, and wherein satisfaction of an alert condition of the one or more alert conditions relating to a lack of a threshold amount of storage space is based on the images of interiors of storage bins for carry-on items.

\* \* \* \* \*